United States Patent
Ye et al.

(10) Patent No.: US 9,665,984 B2
(45) Date of Patent: May 30, 2017

(54) 2D IMAGE-BASED 3D GLASSES VIRTUAL TRY-ON SYSTEM

(71) Applicant: ULSee Inc., Taipei (TW)

(72) Inventors: Zhou Ye, Foster City, CA (US); Chih-Ming Chang, Taipei (TW); Ying-Ko Lu, Taoyuan County (TW); Yi-Chia Hsu, Tainan (TW)

(73) Assignee: ULSee Inc., Taipei (TW)

(*) Notice: Subject to any disclaimer, the term of this patent is extended or adjusted under 35 U.S.C. 154(b) by 364 days.

(21) Appl. No.: 14/447,652

(22) Filed: Jul. 31, 2014

(65) Prior Publication Data
US 2016/0035133 A1   Feb. 4, 2016

(51) Int. Cl.
| G09G 5/00 | (2006.01) |
| G06T 19/00 | (2011.01) |
| G06T 15/60 | (2006.01) |
| G06F 3/12 | (2006.01) |

(52) U.S. Cl.
CPC ............ *G06T 19/006* (2013.01); *G06T 15/60* (2013.01); *G06F 3/12* (2013.01); *G06T 2210/16* (2013.01)

(58) Field of Classification Search
CPC ..... G06T 19/006; G06T 7/001; G06T 3/4023; G06F 3/011; G06F 3/012
See application file for complete search history.

(56) References Cited

U.S. PATENT DOCUMENTS

| 5,983,201 A * | 11/1999 | Fay | G02C 13/003 705/26.5 |
| 6,142,628 A * | 11/2000 | Saigo | G02C 13/003 351/204 |
| 6,847,383 B2 * | 1/2005 | Agnew | G06T 11/60 345/619 |
| 2009/0273612 A1* | 11/2009 | Xie | G02C 13/003 345/630 |
| 2013/0088490 A1* | 4/2013 | Rasmussen | G06T 17/00 345/421 |
| 2013/0314410 A1* | 11/2013 | Gravois | G06T 19/006 345/420 |
| 2014/0055570 A1* | 2/2014 | Dehais | G06T 17/20 348/47 |
| 2015/0362761 A1* | 12/2015 | Adler | G06T 17/00 705/26.5 |
| 2016/0246078 A1* | 8/2016 | Choukroun | G02C 13/003 |

* cited by examiner

*Primary Examiner* — Robert Craddock
(74) *Attorney, Agent, or Firm* — Alan D. Kamrath; Kamrath IP Lawfirm, P.A.

(57) ABSTRACT

Method to create try-on experience wearing virtual 3D eyeglasses is provided using 2D image data of eyeglasses. Virtual 3D eyeglasses are constructed using set of 2D images for eyeglasses. Virtual 3D eyeglasses is configured onto 3D face or head model and being simulated as being fittingly worn by the wearer. Each set of 2D images for eyeglasses includes a pair of 2D lens images, a frontal frame image, and at least one side frame image. Upon detection of a movement of the face and head of wearer in real-time, the 3D face or head model and the configuration and alignment of virtual 3D eyeglasses are modified or adjusted accordingly. Features such as trimming off of portion of the glasses frame, shadow creating and environment mapping are provided to the virtual 3D eyeglasses in response to translation, scaling, and posture changes made to the head and face of the wearer in real-time.

20 Claims, 22 Drawing Sheets

Translation in x-y axis plane

Scaling Change

Apply Alpha = 0%   Apply Alpha = 50%   Apply Alpha = 100%

Yaw = 0 deg

Yaw = -45 deg

Yaw = 45 deg

2D IMAGE-BASED 3D GLASSES VIRTUAL TRY-ON SYSTEM

BACKGROUND OF THE INVENTION

1. Field of the Invention

The present invention relates to a method of creating real-time try-on experience of wearing virtual 3D eyeglasses by a wearer, and more particularly, to a method for an augmented reality system for creating real-time try-on experience of wearing virtual 3D eyeglasses by a wearer using 2D image-based data for eyeglasses for simulating 3D virtual eyeglasses in real-time.

2. Description of the Prior Art

Augmented reality systems for virtual try-on of 3D virtual eyeglasses have been popular in the eyewear industry for promoting and marketing of eyewear products, such as sunglasses and prescription glasses. This augmented reality system has been achieved traditionally by means of using a large number of 3D model data files of eyeglasses. Typically, the augmented reality system for virtual try-on of 3D virtual glasses operate under one of two modes, namely, a webcam mode and a virtual model mode. While in the webcam mode, a 3D head model of a wearer is created by aligning the face of the wearer with an alignment frame to find correct or proper scaling to construct a solid 3D head model. The captured facial image of the face of the wearer is used to create the 3D head model. Meanwhile, the 3D head model is made invisible but yet still aligned with the face of the wearer. Then, augmented reality is achieved by the superimposing of the 3D virtual glasses being disposed on the generated invisible 3D head model. Later, the wearer can select from among many virtual 3D models for different eyeglasses for performing virtual real-time trying-on of eyeglasses onto the 3D head model of the wearer, and the augmented reality system will automatically fit the selected virtual 3D glasses onto the wear's face in real-time. The wearer can then see his/her face as in a displayed mirror image with the 3D virtual eyeglasses fitted onto his/her face. While, in the virtual model mode, a 3D head model of a wearer is selected from several pre-stored sets of selectable virtual 3D head models. Meanwhile, the 3D head model is made invisible. Then, augmented reality is achieved by the superimposing of the 3D virtual glasses being disposed on the generated invisible 3D head model. Later, the wearer can select from among many virtual 3D models for different eyeglasses for performing virtual real-time trying-on of eyeglasses onto the 3D head model, and the augmented reality system will automatically fit the selected virtual 3D glasses onto the face of the virtual model in real-time. The wearer can then see the 3D virtual model's face as in a displayed mirror image with the 3D virtual eyeglasses fitted thereon. Automated continuous movements for both the head of the virtual 3D model in conjunction along with the virtual 3D glasses are provided during the real-time 3D eyeglasses try-on experience by the wearer.

Because of the requirement and need for having and using 3D models for constructing all of the virtual 3D eyeglasses used for the conventional augmented reality system try-on, under 3D data file formats, such as, for example, EASM, EPRT, SLDASM, SLDPRT, STP, IGES, PRT, ASM, XAS, IPT, therefore, all of the virtual 3D eyeglasses are required to be made and stored in 3D model data file format, which consumes a significant amount of time and effort for maintaining these 3D models. As described in a report titled "An Overview of 3D Data Content, File Formats and Viewers" written by Kenton McHenry and Peter Bajcsy, dated Oct. 31, 2008, a conventional 3D image or 3D model data file is typically a data file which holds data for geometry information (such as, sampled version of the object through vertices, edges, surfaces, and surface patches, etc), data for scene information (such as camera, lights, groups of geometry), and data for appearance information (such as vertex colors, vertex texture coordinates and physical material properties, material information). In addition, the 3D model data files take significant amount of data file storage overhead or space, which is thereby not convenient for the wearer when attempting to download the 3D model data of a new virtual 3D eyeglasses from the internet for try-on in real-time.

Hence, a need for improving the method of achieving satisfactory augmented reality experience for virtual try-on of 3D virtual eyeglasses has become an important topic in this field, and thus there is room for improvement in the art.

SUMMARY OF THE INVENTION

It is one of the objectives of the present invention to provide a method to create real-time try-on experience of wearing virtual 3D eyeglasses by a wearer by constructing a pair of virtual 3D eyeglasses using the just 2D images for the eyeglasses without requiring of storing and using 3D models for the eyeglasses.

It is one of the objectives of the present invention to provide a method to create real-time try-on experience of wearing virtual 3D eyeglasses having adequate visual realism when using just 2D images by providing several additional image effects, including trimming off of excess glasses frame portions to the right-side frame and the left-side frame, respectively, adding lens transparency changes through alpha effect, applying an environmental mapping effect to lenses, and adding shadow effect to the face image.

It is one of the objectives of the present invention to provide an augmented reality system for real-time try-on of 3D virtual eyeglasses by a wearer, which includes a server and a host. A plurality of 2D images for a plurality of pairs of eyeglasses are organized into a group of 2D images stored in the server. The host includes at least a 3D virtual eyeglasses try-on simulation program, and uploads or retrieves the 2D images data from the server for performing 3D virtual eyeglasses try-on simulations.

According to an embodiment of the present invention, a method to create real-time try-on experience of wearing virtual 3D eyeglasses by a wearer is provided which includes at least the following: obtaining a plurality of 2D images for a plurality of pairs of eyeglasses, the pairs of eyeglasses are organized into a group of 2D images, each pair of eyeglasses has a set of 2D images; selecting one pair of eyeglasses from the group of 2D images for try-on by the wearer; constructing a pair of virtual 3D eyeglasses using the set of 2D images for the pair of eyeglasses; constructing a 3D face or head model of the wearer based upon one or more facial and head images of the wearer; fitting the pair of virtual 3D eyeglasses onto the 3D face or head model of the wearer, with the pair of virtual 3D eyeglasses being simulated as being worn by the wearer; and enabling the wearer to select another pair of eyeglasses from the group of 2D images for try-on. Each set of the 2D images for each pair of eyeglasses comprising a frontal frame image and at least one side frame image, and configuration and alignment of the pair of virtual 3D eyeglasses in 3D space are changed based on and corresponding to changes of the 3D face or head model of the wearer accordingly.

According to the embodiments of the present invention, the virtual 3D eyeglasses is rotated together with the 3D face or head model according to a change in real-time posture of the face of the wearer, the virtual 3D eyeglasses is moved together with the 3D face or head model according to the real-time posture of the face of the wearer and one reference point of the face.

According to the embodiments of the present invention, the virtual 3D eyeglasses is zoomed in and out together with the 3D face or head model according to a change in real-time scaling size of the face of the wearer.

According to the embodiment of the present invention, additional optional image effects can be further respectively provided for generating visual realism during real-time try-on experience of wearing virtual 3D eyeglasses using just 2D images, which includes setting the pair of 2D lens images of the set of 2D images at a designated alpha channel value to change the transparency of the lenses of the pair of 3D virtual eyeglasses, applying an environmental mapping effect to the pair of lens images to configure and show a transient modified lens image in place of the 2D lens image in real-time upon satisfying a set criteria according to the real-time posture of the face of the wearer, applying a shadow effect to the face image of the wearer in real-time using the 3D face or head model.

According to another embodiment of the present invention, the 3D virtual eyeglasses try-on simulation program is an app, and the host is a mobile phone or an electronic wireless device in the augmented reality system. In the fourth embodiment, the 3D virtual eyeglasses try-on simulation program can be a webpage, which includes a virtual mirror for trying-on 3D virtual eyeglasses by the wearer, the virtual mirror is configured under a webcam mode or a virtual model mode, upon operating under the webcam mode, real-time facial tracking is performed and a 3D face or head model of the wearer based upon one or more facial and head images of the wearer is generated based upon the real-time facial tracking results.

According to a first embodiment of the present invention, the augmented reality system includes an electronic device, which includes a processor, a camera, a display, a memory, and a 3D virtual eyeglasses try-on simulation program.

According to the embodiments of the present invention, advantages or benefits of the augmented reality system and the method to create real-time try-on experience of wearing virtual 3D eyeglasses by a wearer by constructing a pair of virtual 3D eyeglasses using the just 2D images for the eyeglasses includes at least the following: (1) reducing the amount of work and time required to collect and build sufficient data for each pair of new eyeglasses into the product catalog; (2) 2D image file size of the embodiments of present invention is much smaller than 3D image file size of conventional augmented reality system for real-time try-on of 3D virtual eyeglasses; (3) real-time uploading speed of 2D image data from the server using the internet is much faster than that for 3D images for the conventional augmented reality system; (4) real-time virtual 3D eyeglasses try-on simulation experience for the 2D image based should be more smoother with lesser amount of lag or image blur.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The present invention is illustrated by way of example and not limitation in the figures of the accompanying drawings in which like references indicate similar elements. Besides, many aspects of the disclosure can be better understood with reference to the following drawings. Moreover, in the drawings like reference numerals designate corresponding elements throughout. Wherever possible, the same reference numerals are used throughout the drawings to refer to the same or like elements of an embodiment.

DETAILED DESCRIPTION OF THE INVENTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

In the descriptions of the embodiments of the present invention, several terms or phrases have been specifically defined and utilized so as to provide sufficient description of various technical aspects for understand of the present invention. A 2D image is an image with image pixel data for the length and width dimensions (thus 2D) at a particular pixel resolution and size, such as, i.e. 640×480 pixels with 24-bit color, or 1028×768 pixels with 48-bit true color at various size scaling. In addition, the 2D image may be compressed in JPEG, GIF, TIFF, or PNG format.

Figure 1A:
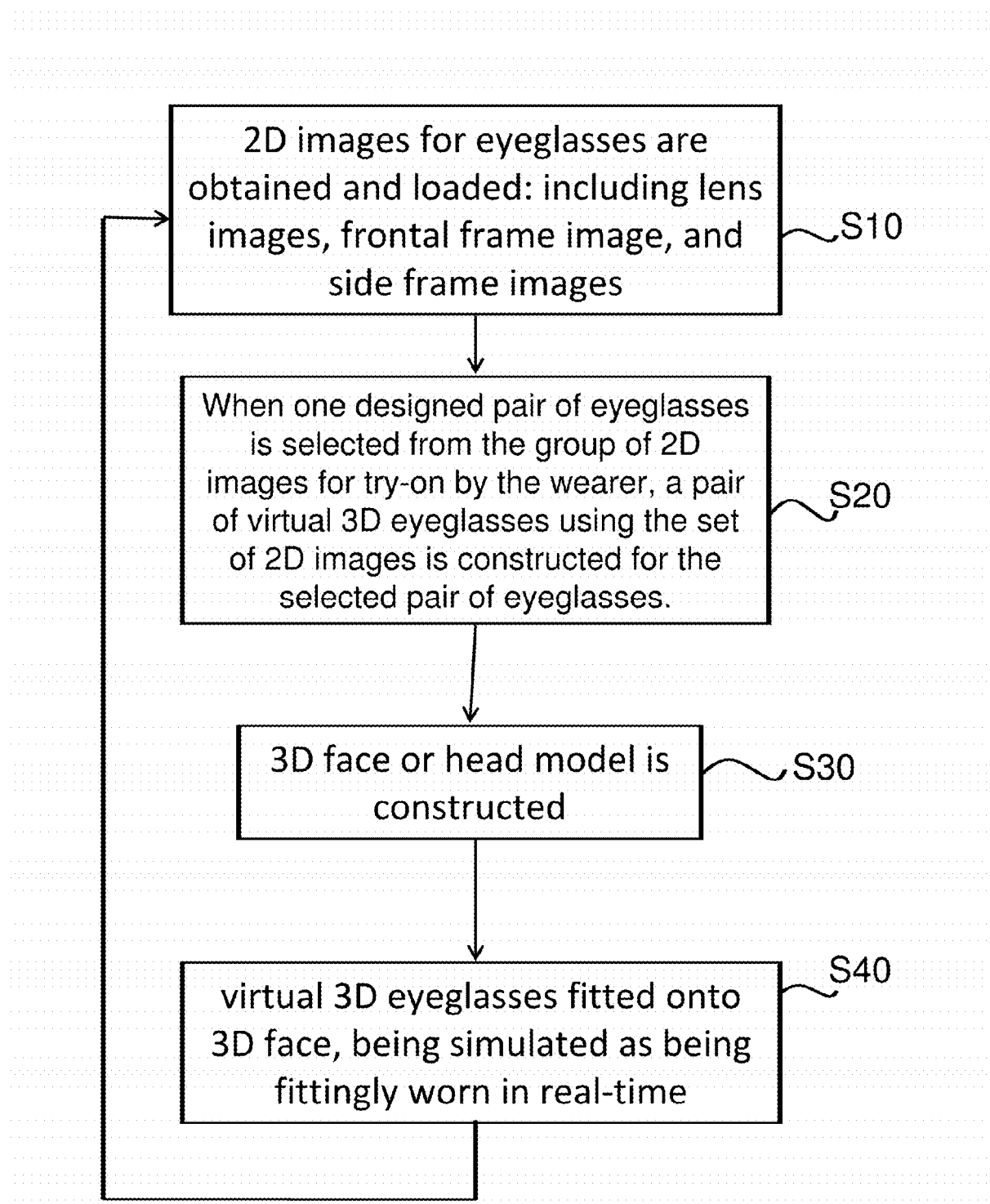
FIGS. 1a and 1b are flow chart diagrams illustrating a method to create real-time try-on experience of wearing virtual 3D eyeglasses by a wearer in accordance with a first embodiment of present invention.
Figure 1B:
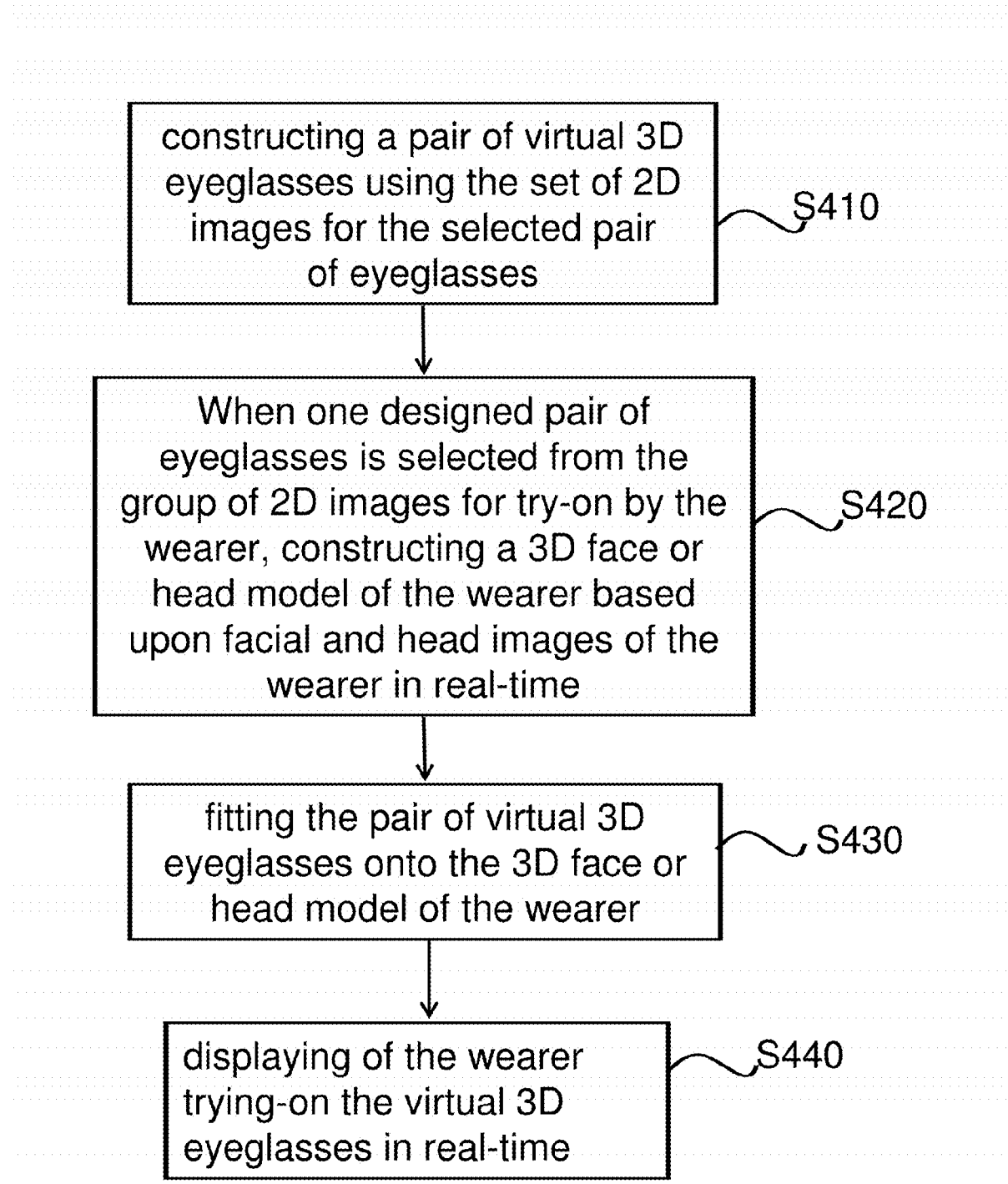
Figure 1C:
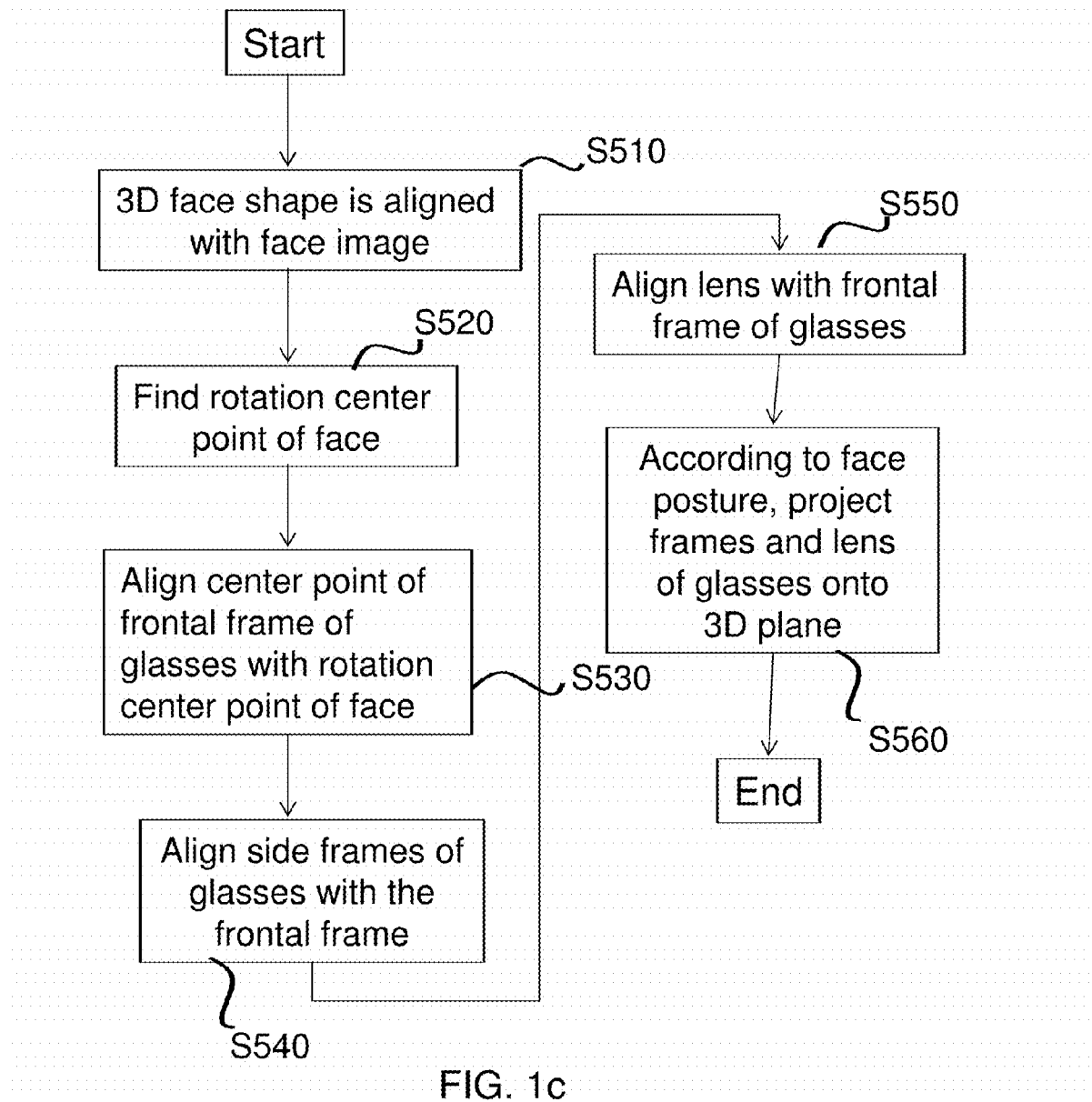
FIG. 1c is a flow chart diagram illustrating a method to align a virtual 3D eyeglasses on a face of the wearer for the first embodiment.

Referring to FIGS. 1*a* and 1*b*, a method to create real-time try-on experience of wearing virtual 3D eyeglasses by a wearer in accordance with a first embodiment is shown in flowchart diagrams of FIGS. 1*a* and 1*b*, which includes the following steps. In step S10, a plurality of 2D images for a plurality of pairs of eyeglasses are obtained and loaded, in which the pairs of eyeglasses are organized into a group of 2D images. Each pair of eyeglasses has a set of 2D images, which includes a pair of 2D lens images, a frontal frame image, and two side frame images. Thus, a total of five 2D images forms one set of 2D images for each pair of eyeglasses. Meanwhile, the pair of 2D lens image includes a left lens image and a right lens image. The frontal frame image is a 2D image of a front portion of the eyeglasses, including a bridge and an endpiece when viewed under a straight-on front view perspective. The two side frame images are 2D images of a temple and an earpiece that are located at a right side and a left side of the eyeglasses frame, respectively. In step S410 of FIG. 1*b*, a pair of virtual 3D eyeglasses using the set of 2D images is constructed for the selected pair of eyeglasses. Then, in step S20 of FIG. 1*a*, and in step S420 of FIG. 1*b*, when one designed pair of eyeglasses is selected from the group of 2D images for try-on by the wearer. Referring to FIG. 1*c*, a method to align the pair of virtual 3D eyeglasses on a face of the wearer is shown to include the following steps. First, in step S510, a 3D face shape is aligned with a face image. Then in step S520, a rotation center point of the face of the wearer is obtained or found.

Later in step S530, the center point of the frontal frame of the virtual 3D eyeglasses is aligned with the rotation center point of the face of the wearer. Then in step S540, the side frames of the virtual 3D eyeglasses are aligned with the frontal frame. In step S550, the two lenses are aligned with the front frame of the eyeglasses. Finally in step S560, the frames and lens of eyeglasses are projected onto 3D plane according to the face posture. Meanwhile, the pair of virtual 3D eyeglasses is constructed by aligning, orienting, and attaching or stitching the right side frame image, the left side frame image, and the pair of 2D lens image with respect to the frontal frame image, respectively, in 3D space to form a plurality of virtual eyeglasses surfaces (but the virtual eyeglasses surfaces do not having any thickness) that can be viewed and rotated in 3D space.

Figure 2A:
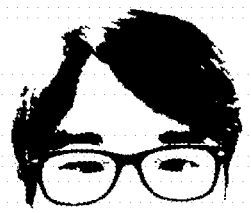
FIGS. 2a-2d are a plurality of diagrams illustrating the configurations and alignments of the pair of virtual 3D eyeglasses produced at different postures of the head and face of the wearer of the embodiments of present invention.
Figure 2B:
Figure 2C:
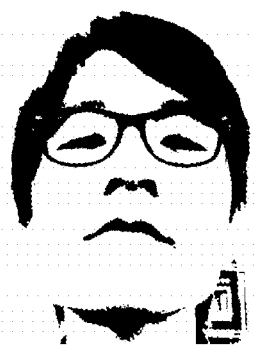
Figure 2D:
Figure 2E:
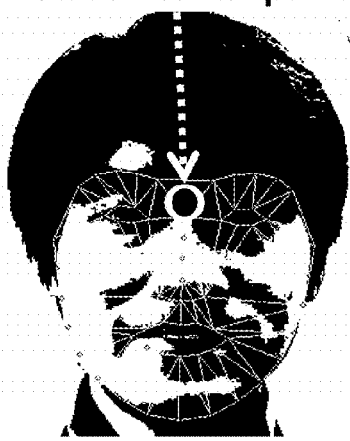
FIGS. 2e and 2f show a 3D face model of the embodiments of present invention and a rotation center point of the frontal frame image, respectively.
Figure 2F:
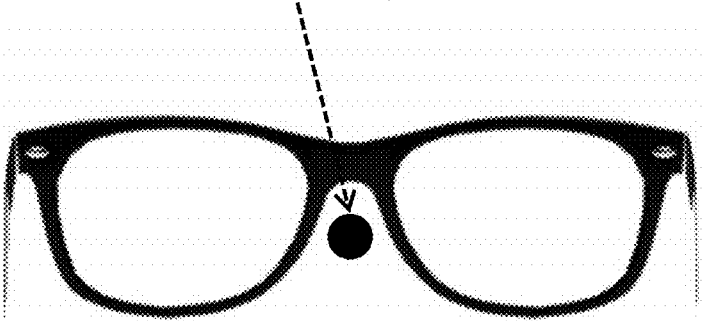
Figures 3A, 3B:
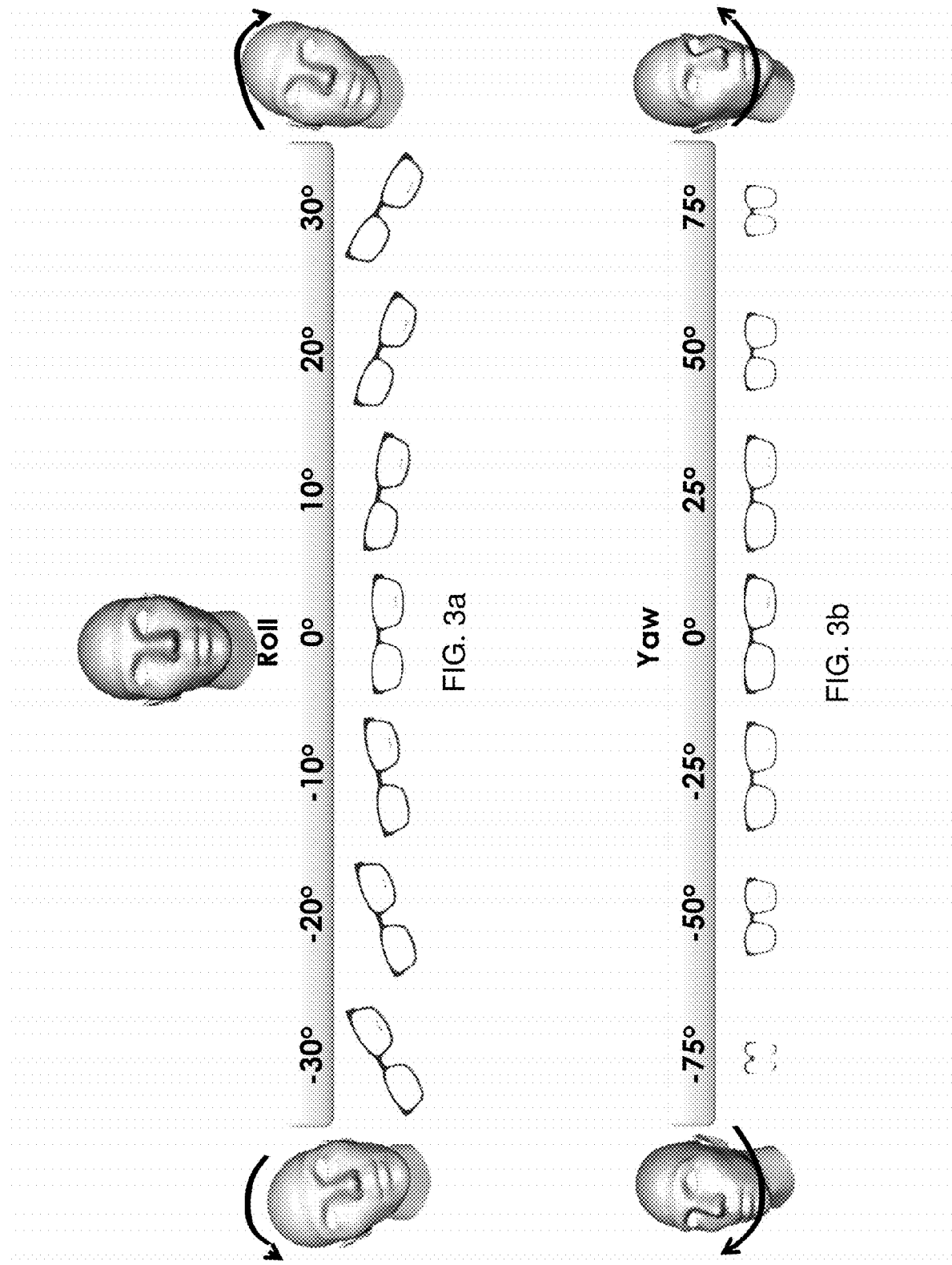
FIGS. 3a, 3b, and 3c are diagrams showing rotational movement of the virtual 3D eyeglasses in the roll, yaw, and pitch directions, respectively.
Figure 3C:
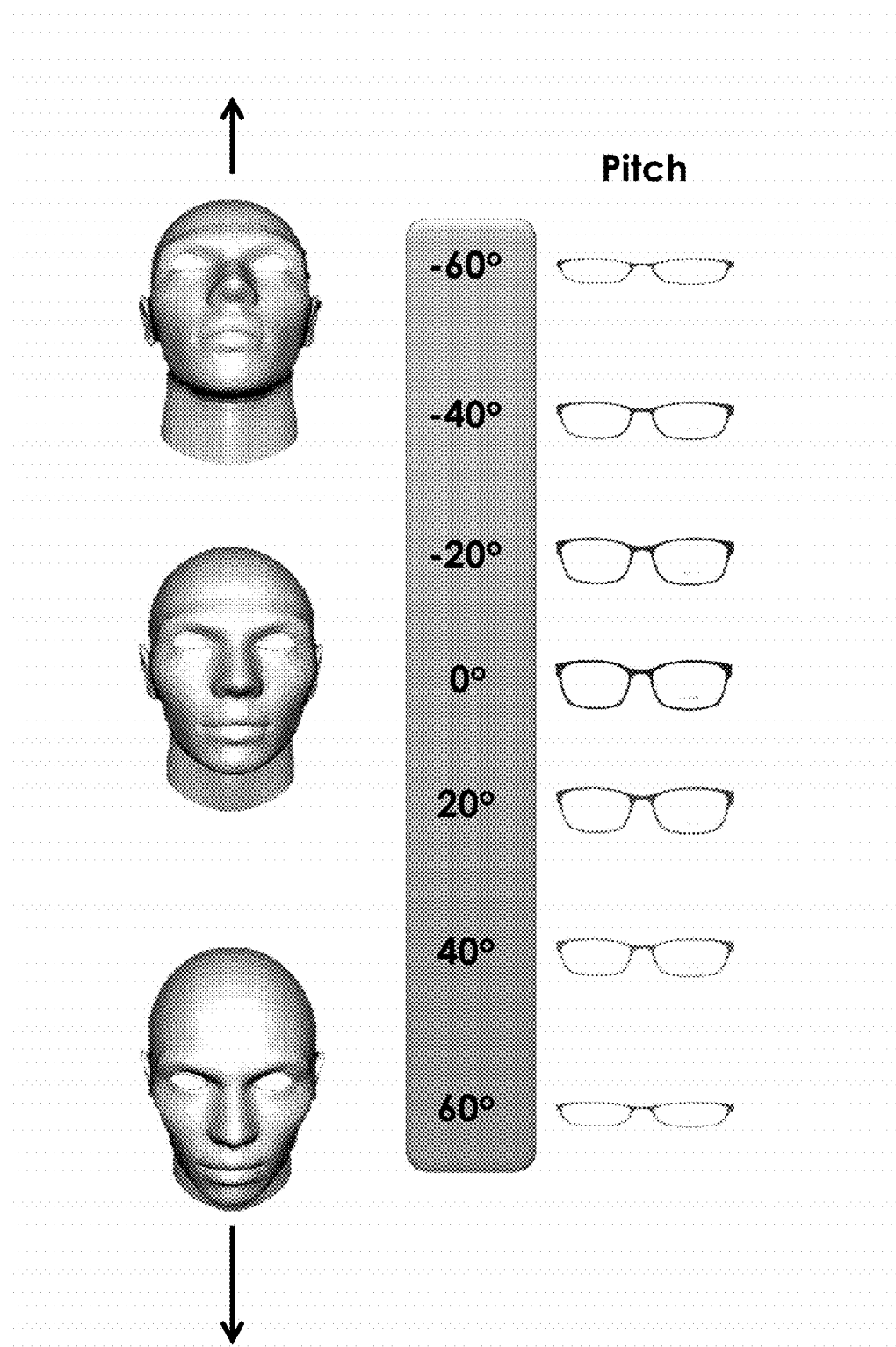

Later in step S30 of FIG. 1*a* and in step S420 of FIG. 1*b*, a 3D face or head model of the wearer based upon one or more facial and head images of the wearer in real-time is constructed, respectively. In step S40 and in step S430, the pair of virtual 3D eyeglasses are fitted or aligned onto the 3D face or head model of the wearer, with the pair of virtual 3D eyeglasses being simulated as being fittingly worn by the wearer. The 3D face or head model of the wearer is aligned with the real-time facial and head images of the wearer. The rotation center point of the 3D face or head model as shown in FIG. 2*e* is aligned with a rotation center point of the frontal frame image as shown in FIG. 2*f*. During the augmented reality experience of wearing the virtual 3D eyeglasses by the wearer, a movement of the face and head of the wearer in real-time can be detected. Such movement can include a rotational movement in a yaw, roll, and/or pitch direction(s), a translational movement in an x-axis and/or y-axis direction, a forward or backward movement (along z-axis direction) so as to change the scaling of the size of the face and head of the wearer. Rotational movement of the virtual 3D eyeglasses in the roll direction can range from +90 degrees to −90 degrees; rotational movement the virtual 3D eyeglasses in the yaw direction can range from +90 degrees to −90 degrees; and rotational movement of the virtual 3D eyeglasses in the pitch direction can range from +90 degrees to −90 degrees. However, referring to FIG. 3*a*, rotational movement of the virtual 3D eyeglasses in the roll direction usually range from +30 degrees to −30 degrees; referring to FIG. 3*b*, rotational movement of the virtual 3D eyeglasses in the yaw direction usually range from +75 degrees to −75 degrees; and rotational movement of the virtual 3D eyeglasses in the pitch direction usually range from +60 degrees to −60 degrees, as shown in FIG. 3*c*.

Figure 3D:
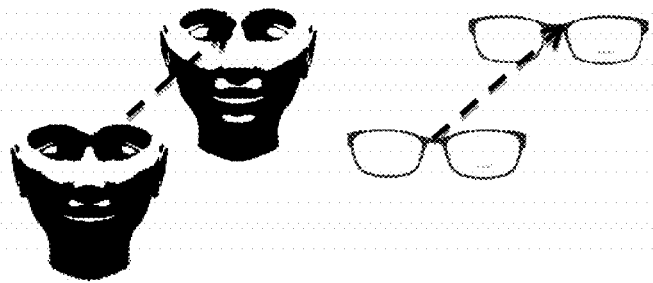
FIG. 3d is a diagram showing translation movement of the virtual 3D eyeglasses in the x-y plane.
Figure 3E:
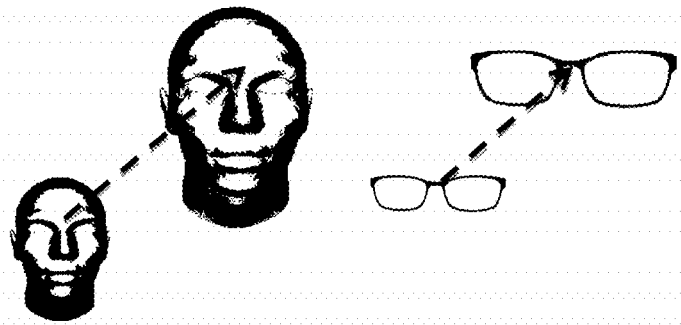
FIG. 3e is a diagram showing movement of the virtual 3D eyeglasses in the z-axis direction for producing scaling change.

Upon detecting of each movement or change in posture of the head and face of the wearer, a substantially same movement is duplicated on the 3D face or head model of the wearer correspondingly in real-time, and the configuration and alignment of the pair of virtual 3D eyeglasses are adjusted accordingly as shown in FIGS. 2*a*-2*d*. The configuration and alignment of the pair of virtual 3D eyeglasses in 3D space can be changed during the augmented reality experience of wearing the virtual 3D eyeglasses by the wearer in step S40 shown in FIG. 1*a* based on at least one or more of the following movements of the head and face of the wearer in real-time, namely, a change in real-time posture, scaling, and translation of the face of the wearer would be accompanied by a corresponding change of the configuration and alignment of the pair of virtual 3D eyeglasses in real-time. For example, as shown in FIG. 3*d*, the virtual 3D eyeglasses can be zoomed in and out together with the 3D face or head model according to a corresponding change in real-time scaling size of the face of the wearer. In other words, the scaling factor for the virtual 3D eyeglasses is adjusted corresponding to real-time scaling factor changes of the 3D face or head model. In addition, the virtual 3D eyeglasses is moved together with the 3D face or head model according to the real-time posture of the face of the wearer and one reference point of the face, which is a rotation center point of the 3D face or head model as shown in FIG. 2e. The 3D face or head model along with the scaling factor value, the roll, yaw, and pitch rotation angle data of the face, and the (x, y) position data of the rotation center point can be displayed for viewing if so desired.

Referring back to FIG. 1b, in step S440, the wearer trying-on the virtual 3D eyeglasses are displayed in real-time. Once the wearer has finished using or trying-on the selected pair of virtual 3D eyeglasses the wearer can select another pair of eyeglasses from the group of 2D images for try-on. In the first embodiment, the group of 2D images can be configured to be a product catalog containing different types of eyeglasses. Then, step S10 through step S40 of FIG. 1a can be repeated as many times as needed or desired. Alternatively, steps S410 through step S440 of FIG. b can be repeated as many times as needed or desired.

In the first embodiment of present invention, several additional steps directly following the step S40 and the step S430 of the first embodiment can be conducted to further provide added visual realism to further mimic or simulate properties of an actual pair of eyeglasses worn by a wearer in real-time, which includes of the following.

Trimming Off of Excess Glasses Frame Portions

Figure 4:
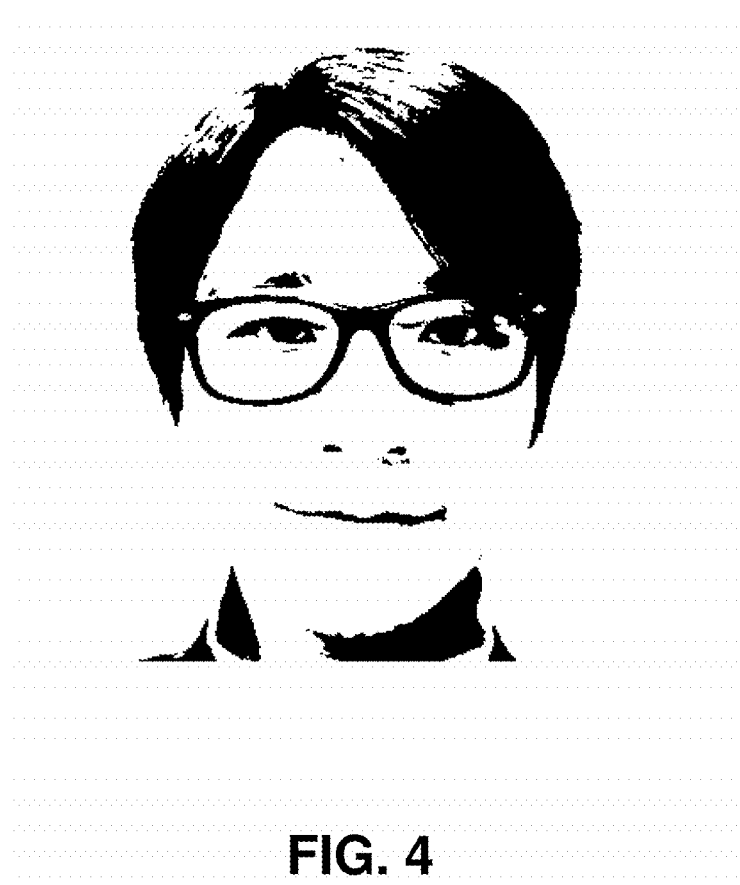
FIG. 4 is a diagram showing a straight-on direction for the 3D face or head model of the wearer.
Figure 5:
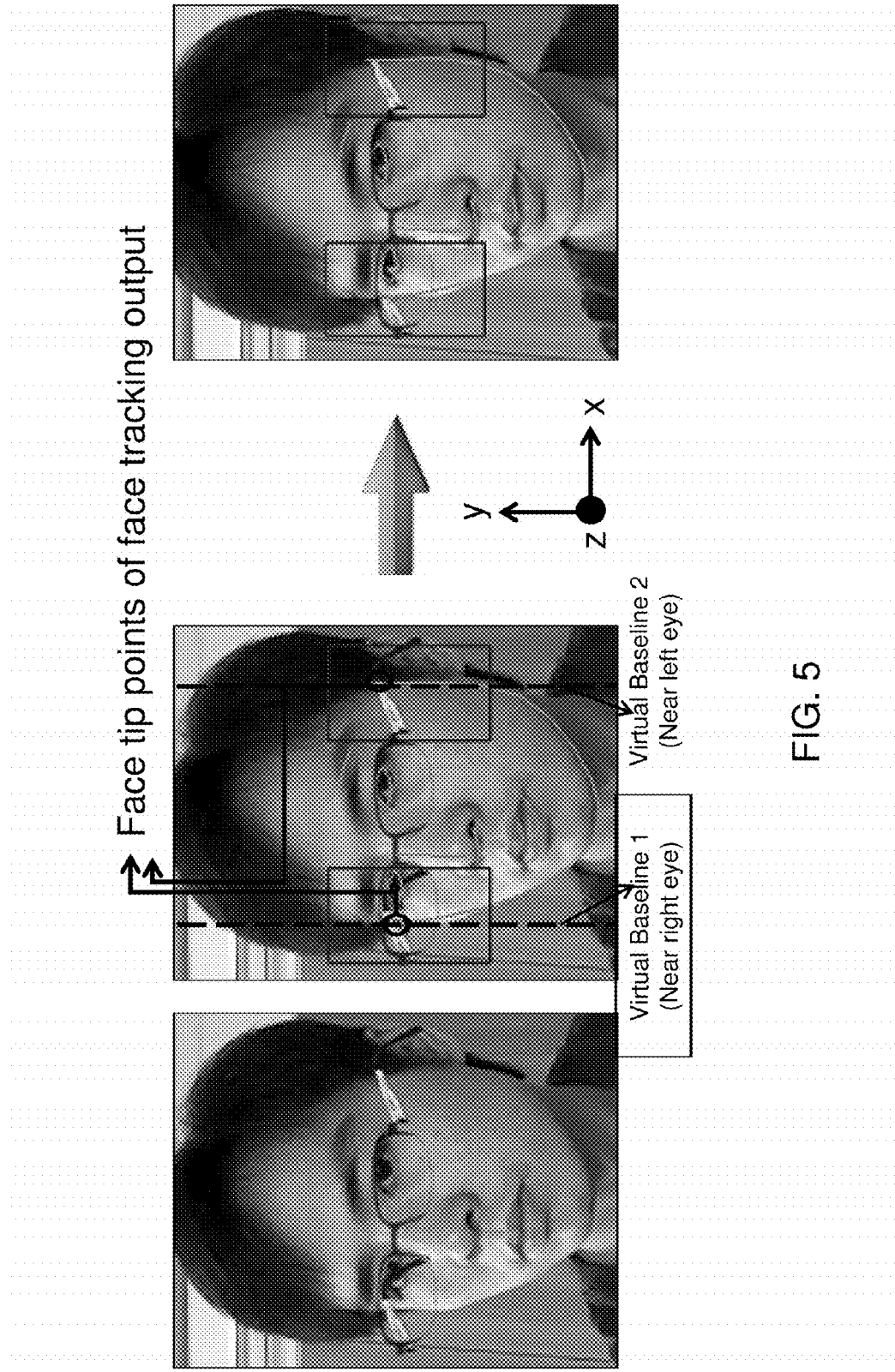
FIG. 5 is a diagram illustrating a method for trimming off a right-side glasses frame portion inside the face upon a rotation of the 3D face or head model of the wearer to the right from the straight-on direction.
Figure 6:
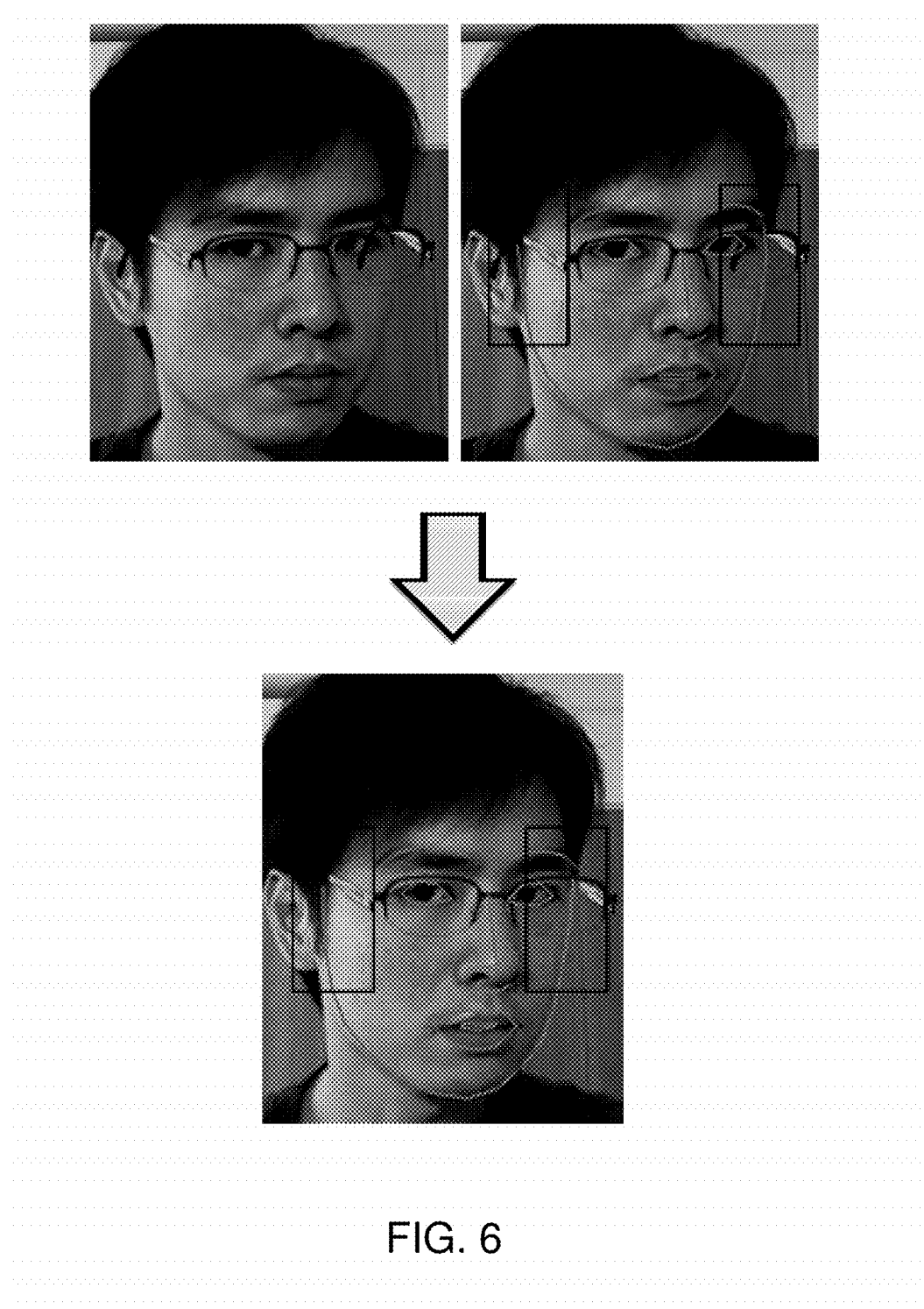
FIG. 6 is a diagram illustrating a method for trimming off a left-side glasses frame portion inside the face upon a rotation of the 3D face or head model of the wearer to the left from the straight-on direction.

As shown in FIG. 5, a right-side glasses frame portion inside the face is trimmed off upon a rotation of the 3D face or head model of the wearer to the right of the straight-on direction shown in FIG. 4. In a second embodiment of present invention, a rotation angle of the 3D face or head model of the wearer is at least 5 degrees to the right of the straight-on direction when a right-side glasses frame portion inside the face is trimmed off. As shown in FIG. 6, a left-side glasses frame portion inside the face is trimmed off upon a rotation of the 3D face or head model of the wearer to the left side from the straight-on direction shown in FIG. 4. In the second embodiment of present invention, a rotation angle of the 3D face or head model of the wearer is at least 5 degrees to the left of the straight-on direction when a left-side glasses frame portion inside the face is trimmed off.

Figure 7:
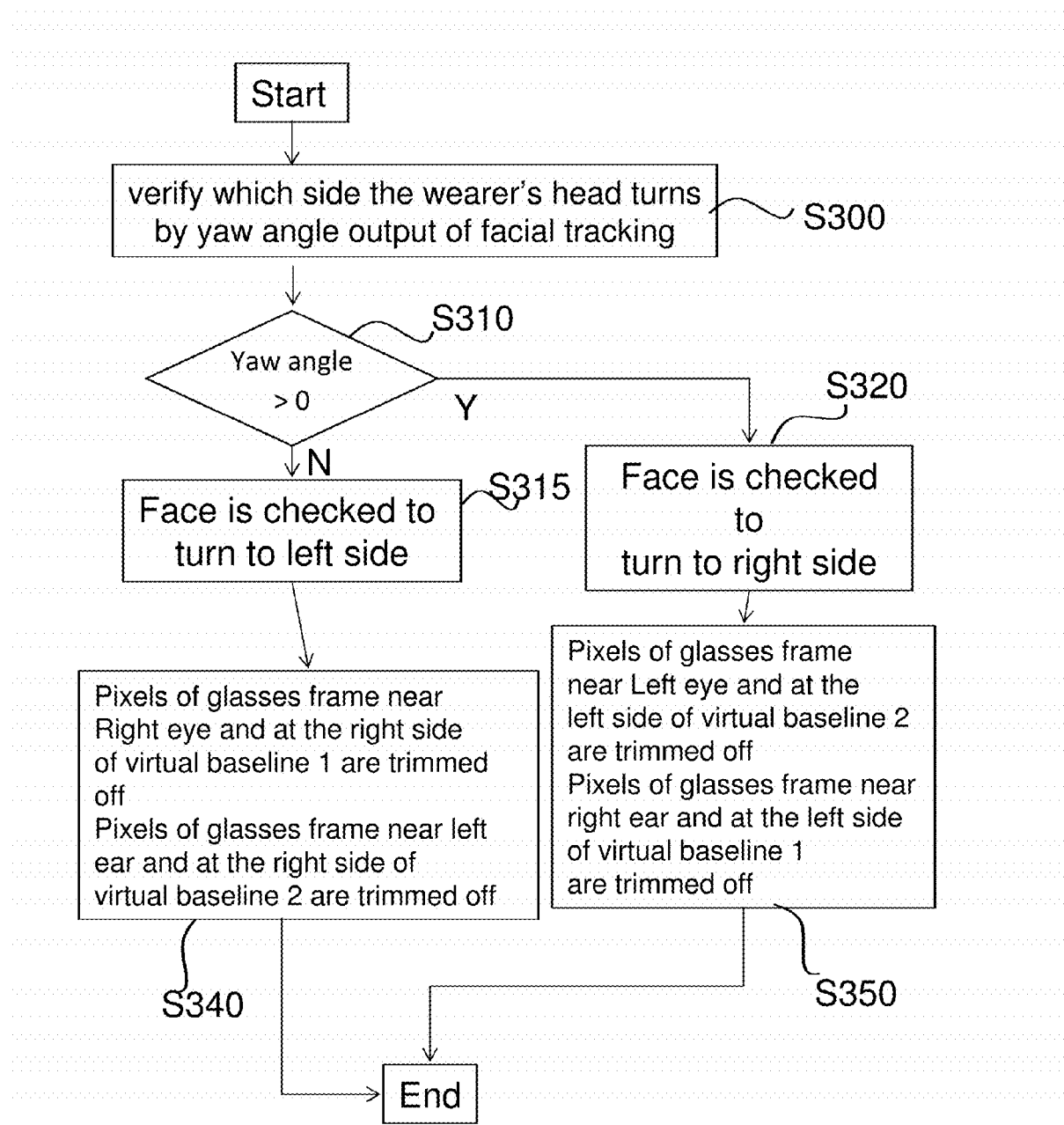
FIG. 7 is a flow chart diagram illustrating the method for trimming off a right-side glasses frame portion inside the face upon a rotation of the 3D face or head model of the wearer to the right from the straight-on direction or trimming off a left-side glasses frame portion inside the face upon a rotation of the 3D face or head model of the wearer to the left from the straight-on direction.

As shown in FIG. 7, the method for trimming off a right-side glasses frame portion inside the face upon a rotation of the 3D face or head model of the wearer to the right or trimming off a left-side glasses frame portion inside the face upon a rotation of the 3D face or head model of the wearer to the left is illustrated in a flow chart diagram described as follow. In step S300, the side that the wearer's head has turned is verified by yaw angle output of facial tracking. In step S310, the yaw angle is determined. In step S315, upon determining that the face is checked to be turned to be the left side, then step S340 is performed, which includes the trimming off of the pixels of glasses frame near right eye and at the right side of virtual baseline 1 (virtual baseline 1 is shown in FIG. 5), and the pixels of glasses frame near left ear and at the right side of virtual baseline 2 (virtual baseline 2 is shown in FIG. 5) are trimmed off. In step S320, upon determining that the face is checked to be turned to be the right side, then step S350 is performed, which includes the trimming off of the pixels of glasses frame near left eye and at the left side of virtual baseline 2 as shown in FIG. 5, and the pixels of glasses frame near the right ear and at the left side of virtual baseline 1 as shown also in FIG. 5 are trimmed off.

Adding Lens Transparency Changes

Figures 8A, 8B, 8C:
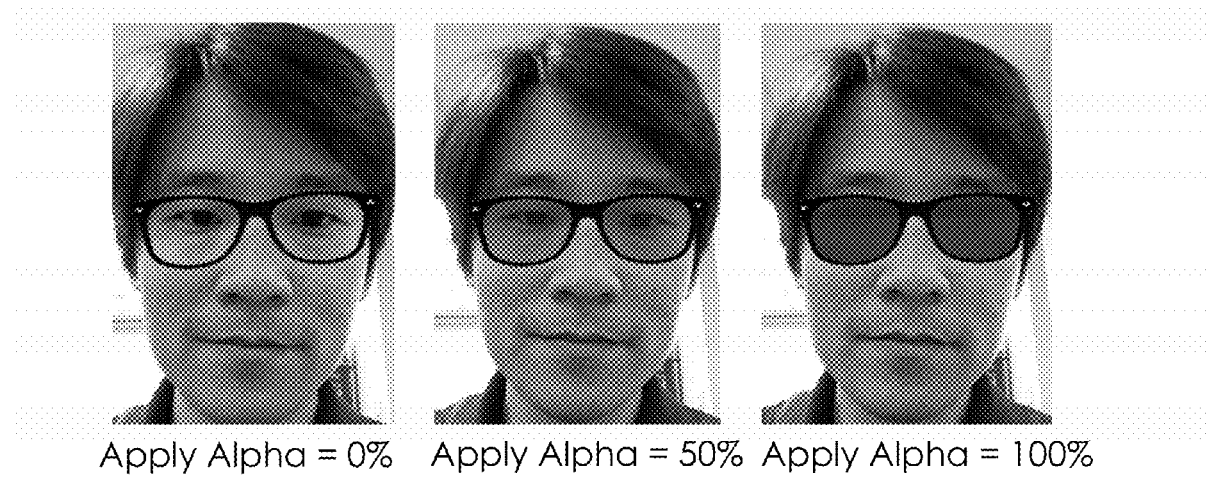
FIGS. 8a, 8b, and 8c are diagrams illustrating the transparency of the lenses with alpha channel value of 0%, 50% and 100%, respectively to change the transparency thereof.
Figure 9:
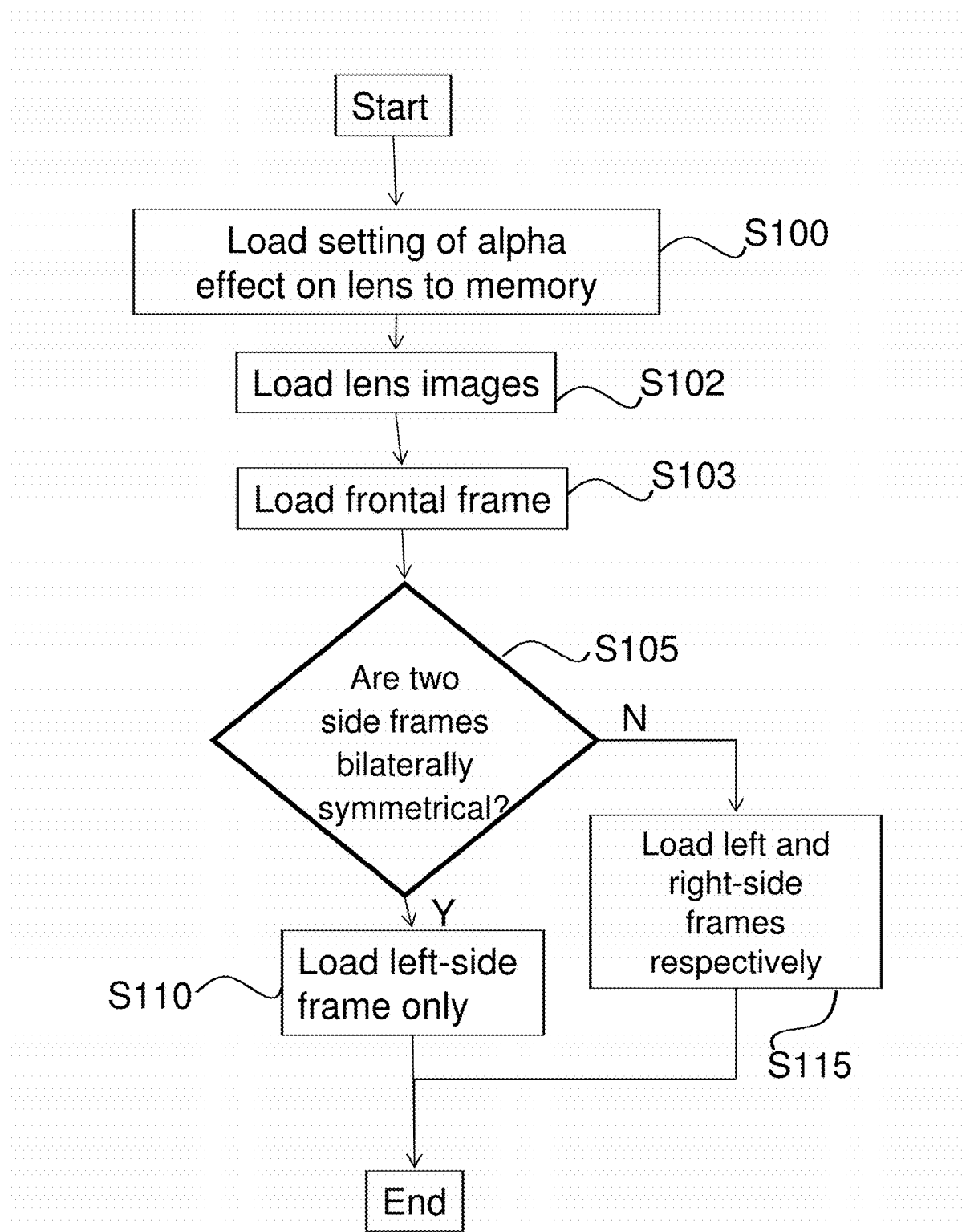
FIG. 9 is a flowchart of a method for adding transparency effects for the virtual 3D eyeglasses.
Figure 12:
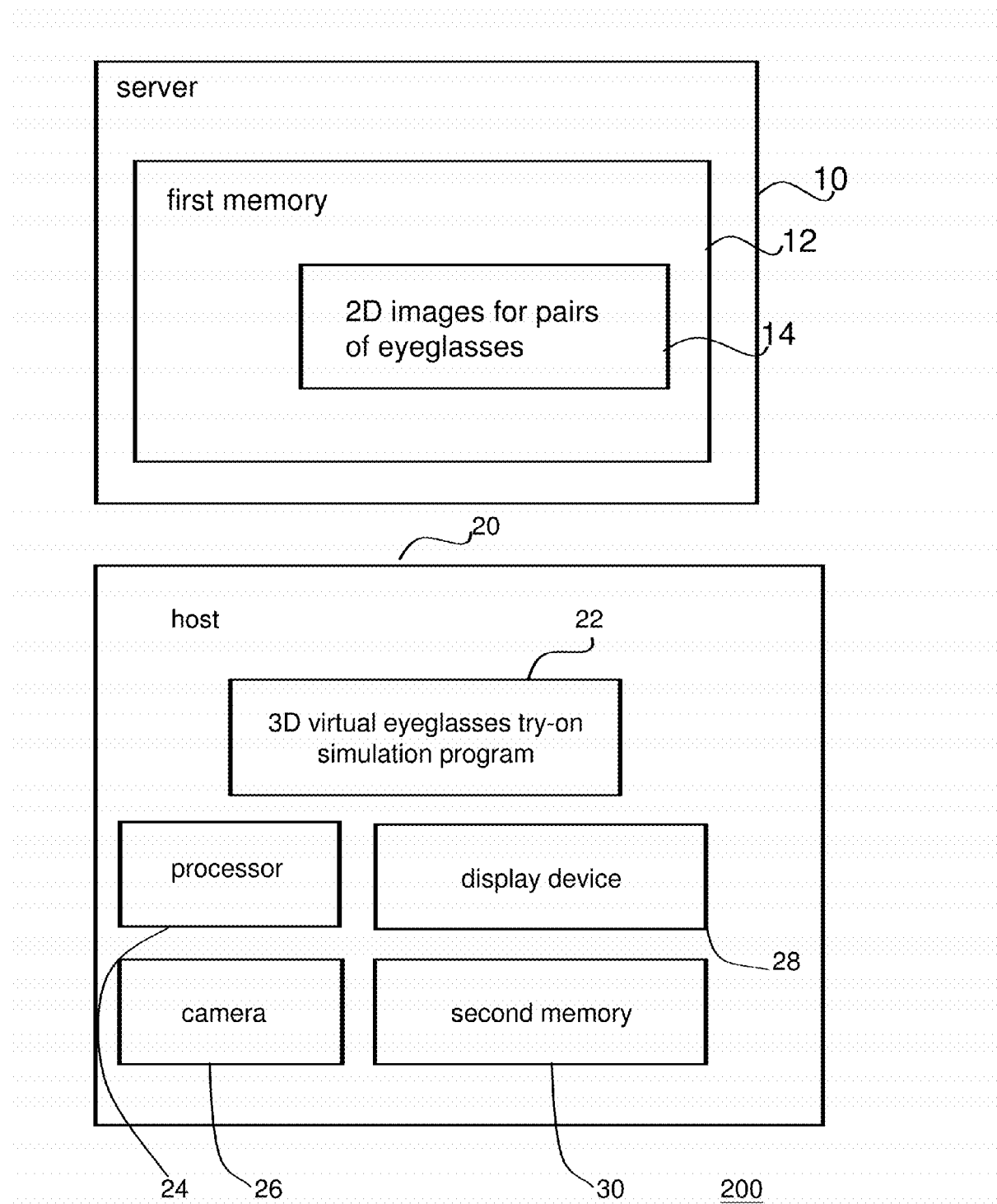
FIG. 12 is a block diagram of an augmented reality system for real-time try-on of 3D virtual eyeglasses by a wearer in accordance with an embodiment of present invention.

Another optional step for adding visual realism to the virtual 3D eyeglasses made from the 2D images involve the adding of lens tint and transparency. In a third embodiment of present invention, the pair of 2D lens images of the set of 2D images are based on 2D image that are set at a designated alpha channel value, such as 50% or 100% as shown in FIGS. 8b and 8c, respectively to change the transparency of the lenses of the pair of 3D virtual eyeglasses from that of alpha channel value of 0% of the first embodiment as shown in FIG. 8a. As shown in FIG. 9, a method for adding transparency effects for the virtual 3D eyeglasses worn by the wearer in real-time includes the following steps. In step S100, the pair of 2D lens images having the designated alpha channel value, such as 50% or 100%, for example, are loaded to the second memory of the host (as described in the fourth embodiment as shown in FIG. 12). In step S102, the lens images are loaded. In step S103, the frontal frame image is loaded. In step S105, the 2D images of the two side frames, namely the right-side frame and the left-side frame, are thereby compared to see whether or not they are bilaterally symmetrical. In step S110, upon determining that the two side frames are bilaterally symmetrical, only the left-side frame is loaded. In step S115, upon determining that the two side frames are not bilaterally symmetrical, both the right-side frame and the left-side frame are loaded, respectively.

Applying an Environmental Mapping Effect to Lenses

Figure 10B:
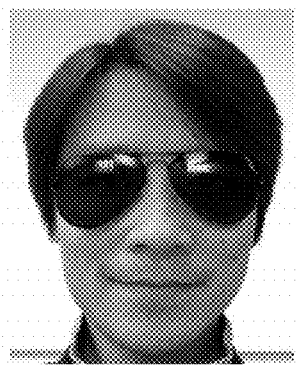
FIGS. 10a, 10b, and 10c are a plurality of diagrams showing an environmental mapping effect applied to the pair of lens images when yaw rotation angle is −45 degrees, yaw rotation angle is 0 degrees, and yaw rotation angle is 45 degrees, respectively.
Figure 10A:
Figure 10C:

Yet another optional step for adding visual realism to the virtual 3D eyeglasses made from the 2D images involve the applying of an environmental mapping effect to the pair of lens images to configure and show a transient modified lens image in place of the 2D lens image in real-time upon satisfying a set criteria according to the real-time posture of the face of the wearer. As observed in FIGS. 10a, 10b, and 10c, an environmental mapping effect has been applied to the pair of lens images to configure and show the transient modified lens images in FIG. 10a when rotation angle in a yaw direction is −45 degrees, to show the transient modified lens images in FIG. 10b when rotation angle in a yaw direction is 0 degrees, and to show the transient modified lens images in FIG. 10c when rotation angle in a yaw direction is 45 degrees. Thus, such set criteria can be based on the amount of rotation angle in yaw direction according to the real-time posture of the face of the wearer.

In addition, the environmental mapping effect is realized through projecting an environmental texture onto a default curved 3D surface, and applying a portion of the projected environmental texture on the lens, which is followed by changing the image content of the portion of the environmental texture according to the posture configuration, which is namely the yaw, pitch, and roll angle of the head and face of the wearer and of the corresponding 3D head and face model.

Adding Shadow Effect to the Face Image

Figure 11A:
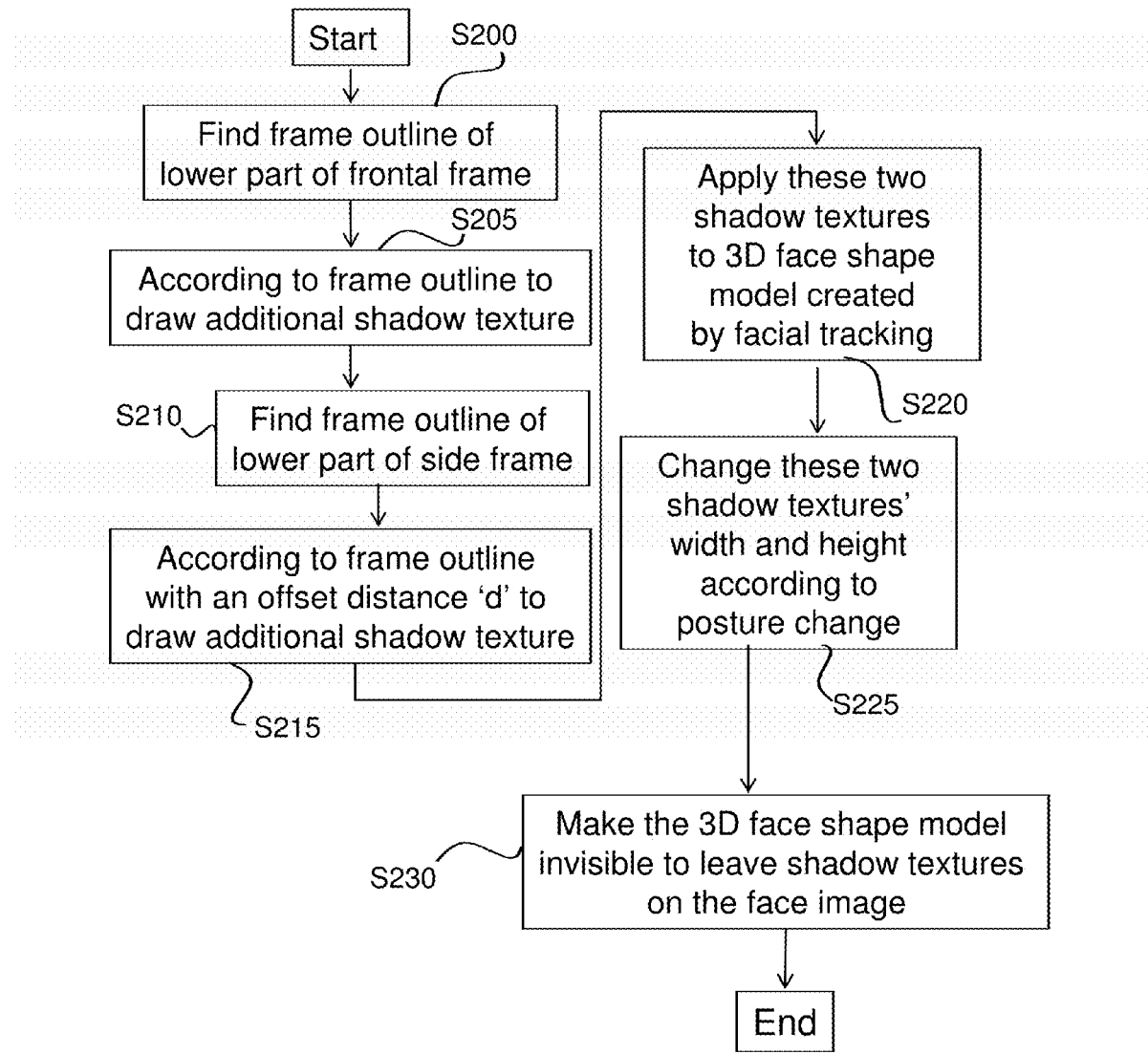
FIG. 11a is a flowchart of a method for applying of a shadow effect to the face image of the wearer in real-time using the 3D face or head model.
Figure 11B:
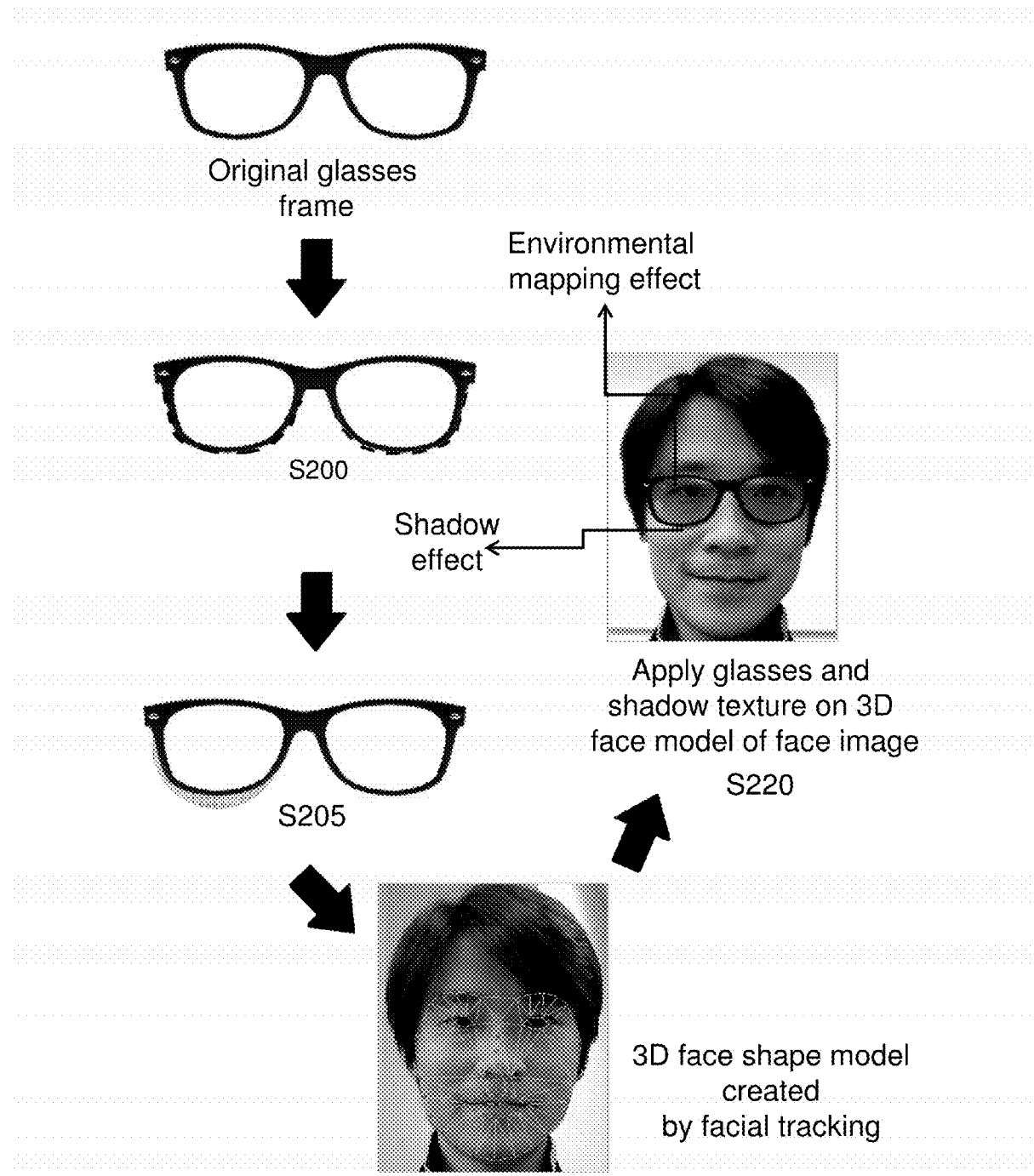
FIGS. 11b and 11c show an illustrative example of environmental mapping effect and shadow effect being simulated on the wearer while trying-on the 3D virtual eyeglasses under front view, and under side view, respectively.
Figure 11C:
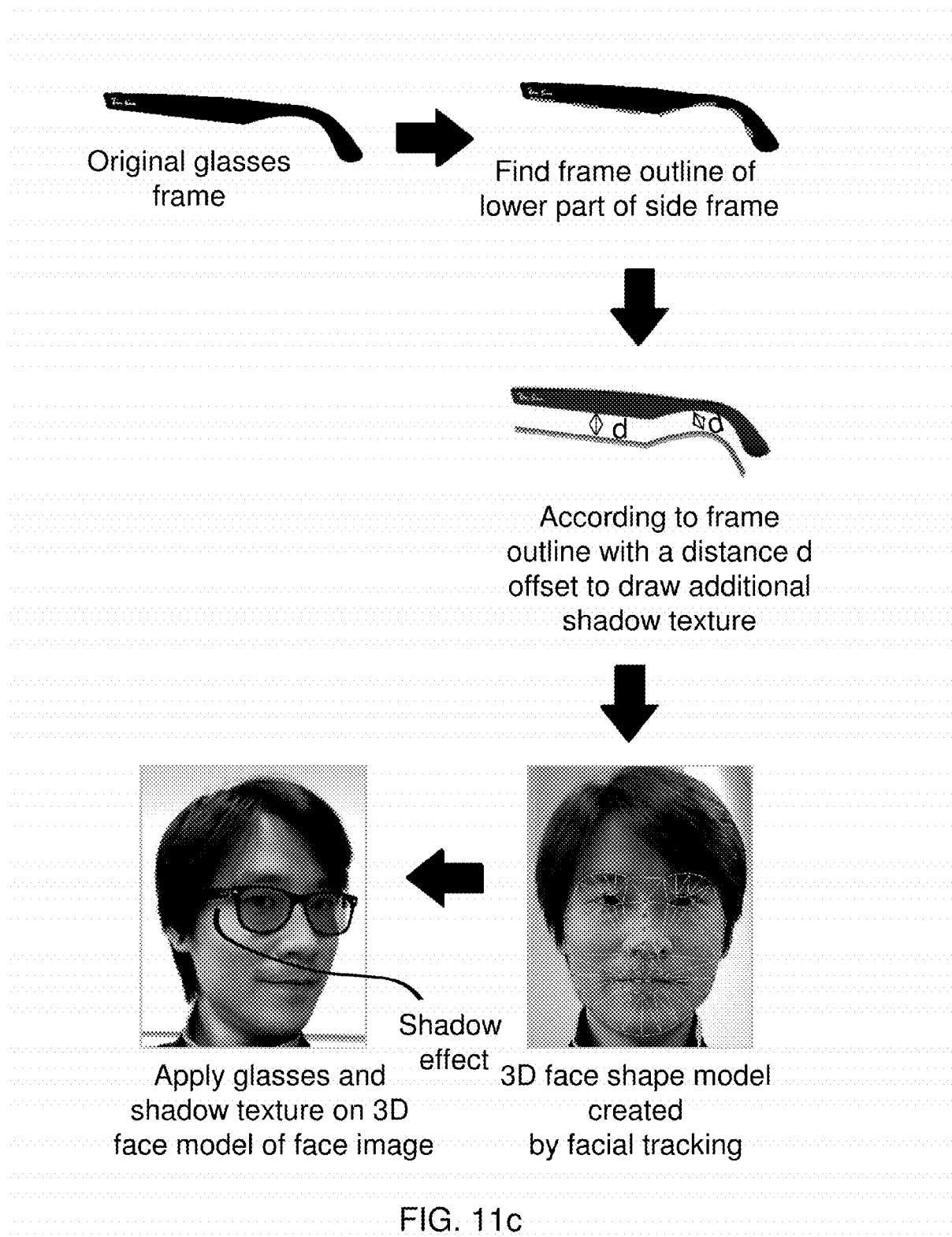
Figure 11D:
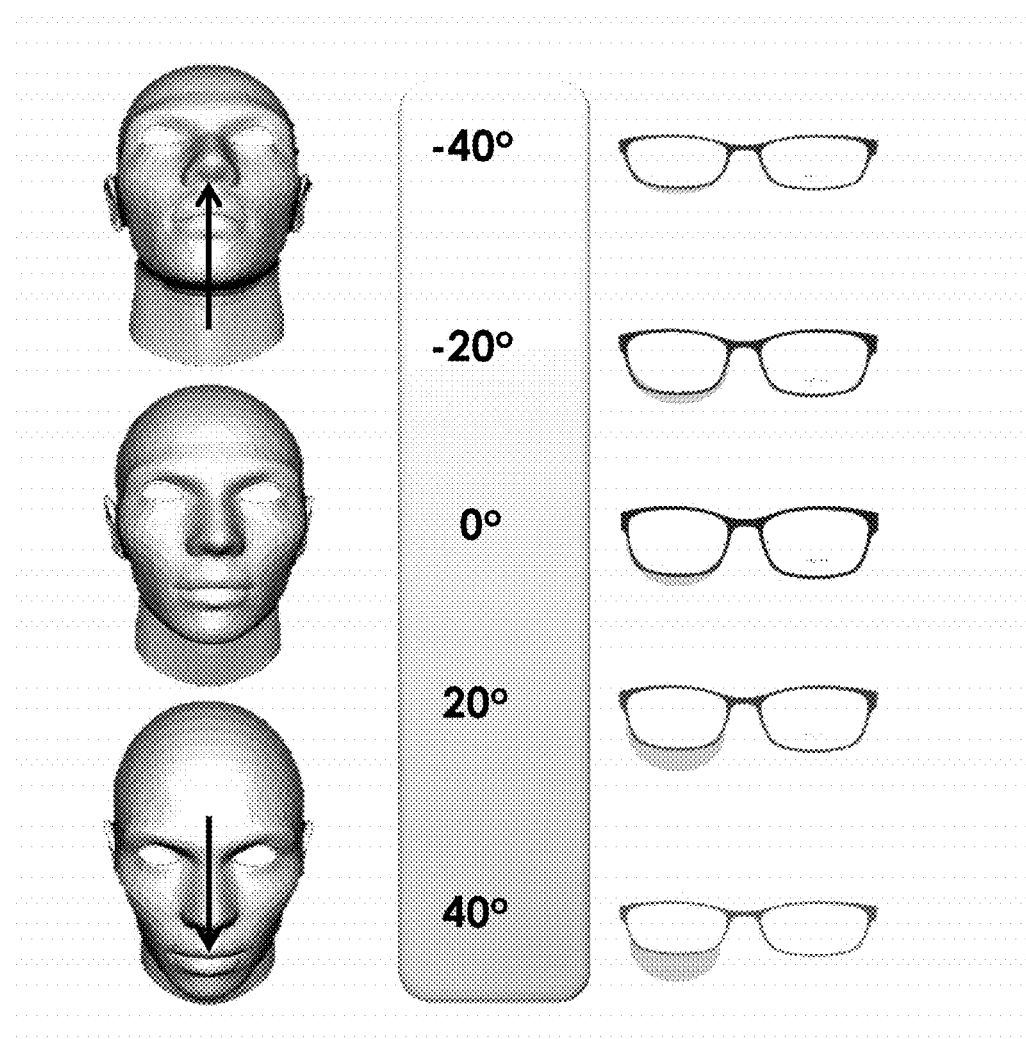
FIGS. 11*d* and 11*e* show how the width and height of shadow effect can be changed according to posture changes to mimic real shadow effect, and how the shadow's height and width can be adjusted.
Figure 11E:
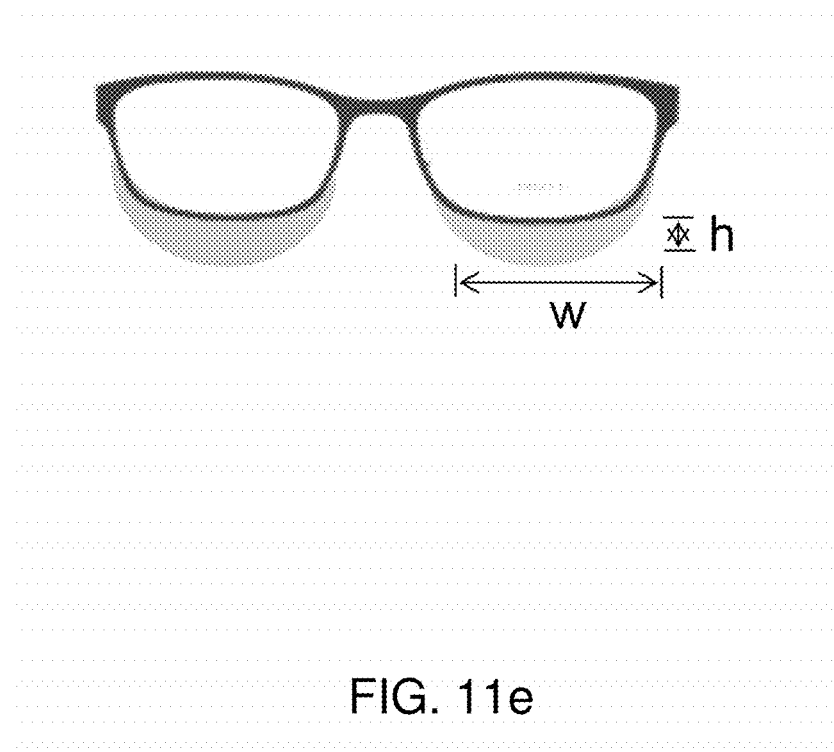

Yet still another optional step for adding visual realism to the virtual 3D eyeglasses made from the 2D images involve applying of a shadow effect to the face image of the wearer in real-time using the 3D face or head model. As shown in FIG. 11a, a method for adding shadow effect to the face image is described in the following steps. In step S200, a frame outline of a lower portion of the front frame is determined. In step S205, an additional shadow texture is drawn according to the frame outline. In step S210, a frame outline of the lower part of the side frame is determined. In step S215, an additional shadow texture is drawn according to the frame outline with an offset distance "d". In step S220, the two shadow textures described above are applied to the 3D face or head model created by facial tracking. In step S225, the width and height of the two shadow textures according to the posture changes. In step S230, the 3D face or head model is made invisible to leave behind the two shadow textures on the 3D face or head model. Referring to FIG. 11b, (in which some of the steps are identical to those found in FIG. 11a), an illustrative example of shadow effect as being simulated under front view is shown. In the illustrated example, the 3D face shape model is created by facial tracking, and the eyeglasses and the shadow texture are applied on the 3D face model of the face image. Referring to FIG. 11c, (in which some of the steps are similar to those found in FIG. 11b), an illustrative example of environmental mapping effect and shadow effect as being simulated under side view is shown. In the illustrated example, the frame outline of the lower part of the side frame is found, the 3D face shape model is created by facial tracking, and the eyeglasses and the shadow texture are applied on the 3D face model of the face image. In addition, an additional shadow texture is drawn according to a frame outline with a distance d offset. Referring to FIG. 11d, the width and height of shadow effect can be changed according to posture changes to mimic or simulate the real shadow effect affected by lighting. Referring to FIG. 11e, the shadow's height h can be adjusted according to a corresponding pitch angle change. Meanwhile, the shadow's width w can be adjusted according a corresponding yaw angle change.

For the sake of optimizing visual realism to the virtual 3D eyeglasses, each of the above effects, namely, trimming off of excess glasses frame portions to the right-side and the left-side, respectively, adding lens transparency changes through alpha effect, applying an environmental mapping effect to lenses, and adding shadow effect to the face image can all be utilized during step S40 of the method of the first embodiment to create improved real-time try-on experience of wearing virtual 3D eyeglasses.

Referring to FIG. 12, a block diagram for an augmented reality system 200 for real-time try-on of 3D virtual eyeglasses by a wearer in accordance with a fourth embodiment is shown. The augmented reality system 200 for 3D virtual eyeglasses try-on includes a server 10 and a host 20. The server 10 includes a first memory 12 and a plurality of 2D images for a plurality of pairs of eyeglasses 14 stored in the first memory 12. The 2D images for the eyeglasses 14 are organized into a group of 2D images, which are being stored in the first memory 12. The host includes a 3D virtual eyeglasses try-on simulation program 22, a processor 24, a camera 26, a display device 28 and a second memory 30. Each pair of eyeglasses has a set of 2D images which are combined together to form the group of 2D images. The set of 2D images of at least one pair of eyeglasses is stored in the second memory 30. The 3D virtual eyeglasses try-on simulation program 22 stored in the host 20 is adapted to perform at least the following tasks, which includes: selecting one pair of eyeglasses and retrieving the set of 2D images thereof from the group of 2D images from the first memory 12 of the server 10 to be transiently stored in the second memory 30 of the host 20 for try-on by the wearer, constructing a pair of virtual 3D eyeglasses using the set of 2D images for the pair of eyeglasses retrieved from the second memory 30, constructing a 3D face or head model of the wearer based upon one or more facial and head images of the wearer captured by the camera 26 in real-time, configuring the pair of virtual 3D eyeglasses onto the 3D face or head model of the wearer, with the pair of virtual 3D eyeglasses being simulated as being fittingly worn by the wearer, displaying of the wearer trying-on the virtual 3D eyeglasses in real-time on the display device 28, and selecting another pair of eyeglasses from the group of 2D images stored in the first memory 12 for try-on by the wearer upon receiving a selection command as shown in step S460 of FIG. 1b. The selection command can be in the form of pressing down on the image of the another pair of eyeglasses while being displayed on the displaying device 28. Each set of the 2D images for each pair of eyeglasses are stored in the first memory 12 and in the second memory 30, respectively. In addition, each set of the 2D images includes a pair of 2D lens images, a frontal frame image, and a side frame image. Meanwhile, upon a detection of a movement of the face and head of the wearer in real-time when captured by the camera 26, the 3D face or head model of the wearer is changed correspondingly, and configuration and alignment of the pair of virtual 3D eyeglasses are adjusted accordingly. Indeed, the augmented reality system for real-time try-on of 3D virtual eyeglasses 200 of FIG. 12 utilizes the method of the first embodiment of FIGS. 1a and 1b for performing various functions and operations in the server 10 and the host 20, respectively. In the augmented reality system 200, the 3D virtual eyeglasses try-on simulation program 22 can be an app, and the host 20 can be a mobile phone or an electronic wireless device. In an alternative embodiment, the 3D virtual eyeglasses try-on simulation program 22 can be a webpage, which includes a virtual mirror for trying-on 3D virtual eyeglasses by the wearer. The virtual mirror is configured under a webcam mode or a virtual model mode. When operating under the webcam mode, the set of 2D image for the selected pair of eyeglasses is loaded from the first memory 12 of the server 10 to the second memory 30 of the host 20, real-time facial tracking is performed. Then as in step S20 of the first embodiment, a pair of virtual 3D eyeglasses using the set of 2D images is constructed for the pair of eyeglasses. Later, a 3D face or head model of the wearer based upon one or more facial and head images of the wearer is generated based upon the real-time facial tracking results, as similarly described in step S30 of the first embodiment. Later, the pair of virtual 3D eyeglasses are fitted or configured onto the 3D face or head model of the wearer, with the pair of virtual 3D eyeglasses being simulated as being fittingly worn by the wearer (same as in step S40 in first embodiment).

Figure 13:
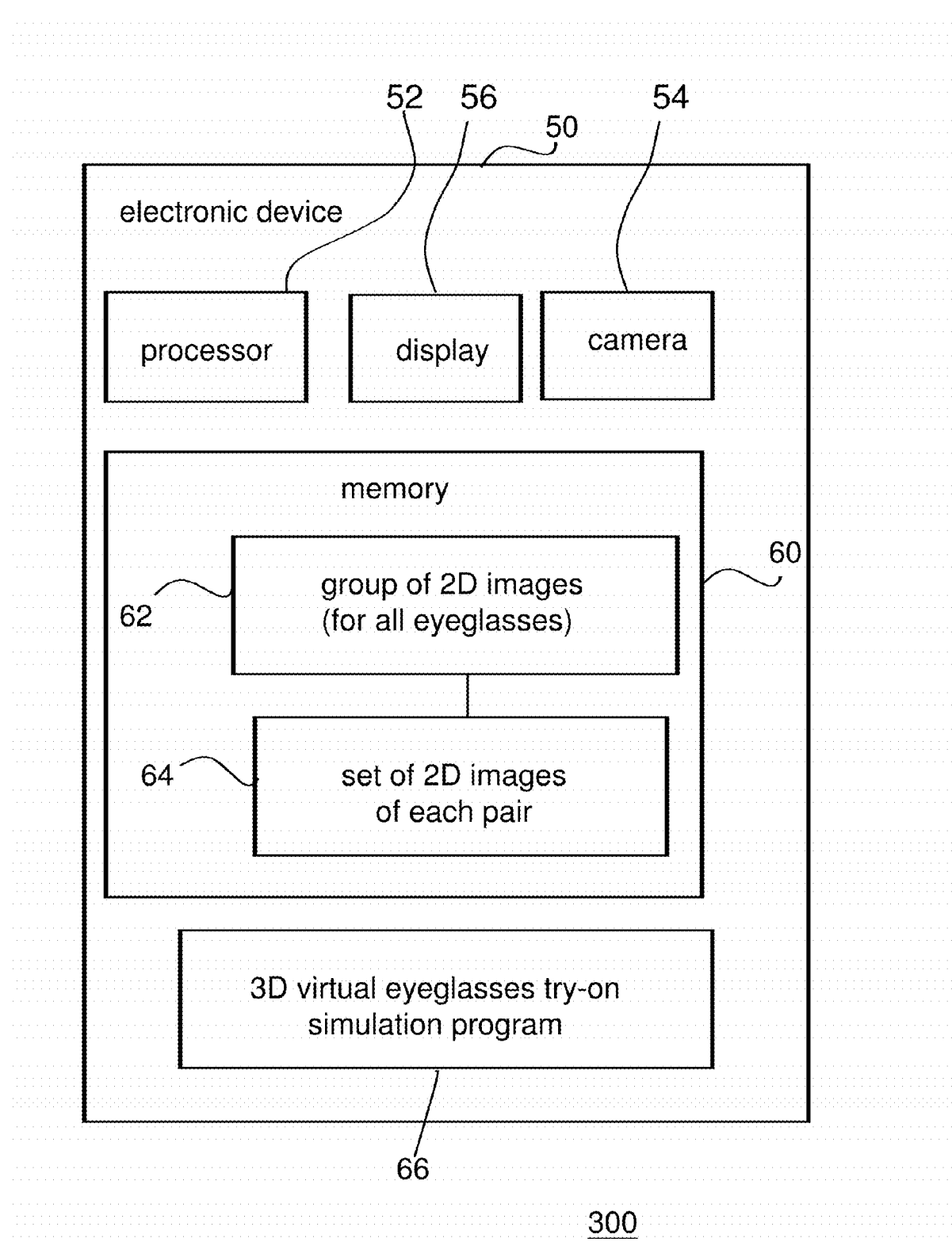
FIG. 13 is a block diagram of another augmented reality system for real-time try-on of 3D virtual eyeglasses by a wearer in accordance with another embodiment is shown.

Referring to FIG. 13, an another augmented reality system 300 for real-time try-on of 3D virtual eyeglasses by a wearer in accordance with a fifth embodiment is shown. This embodiment has an electronic device 50, which includes a processor 52, a camera 54, a display 56 and a memory 60, and a 3D virtual eyeglasses try-on simulation program 66. In the fifth embodiment, both the group of 2D images 62 (for all of the pairs of eyeglasses) and the set of 2D images of each pair of eyeglasses 64 are stored in the memory 60 of the electronic device 50, respectively. The 3D virtual eyeglasses try-on simulation program 66 is adapted to perform the tasks comprising of selecting one pair of eyeglasses and retrieving one set of 2D images from the group of 2D images 62 from the memory 60 for try-on by the wearer, constructing a pair of virtual 3D eyeglasses using the set of 2D images for the selected pair of eyeglasses 64 retrieved from the memory 60, constructing a 3D face or head model of the wearer based upon one or more facial and head images of the wearer captured by the camera 54 in real-time, configuring the pair of virtual 3D eyeglasses onto the 3D face or head model of the wearer, with the pair of virtual 3D eyeglasses being simulated as being fittingly worn by the wearer, displaying of the wearer trying-on the virtual 3D eyeglasses in real-time on the display 56, and selecting another pair of eyeglasses from the group of 2D images 62 stored in the memory for try-on by the wearer upon receiving a selection command of step S460 of FIG. 1b. Each set of the 2D images for each pair of eyeglasses being stored in the memory 60 includes a pair of 2D lens images, a frontal frame image, and a side frame image. Upon a detection of a movement of the face and head of the wearer in real-time when captured by the camera 54, the 3D face or head model of the wearer is changed correspondingly, and configuration and alignment of the pair of virtual 3D eyeglasses are adjusted accordingly.

It is believed that the present embodiments and their advantages will be understood from the foregoing description, and it will be apparent that various changes may be made thereto without departing from the spirit and scope of the embodiments or sacrificing all of its material advantages.

What is claimed is:

1. A method to create real-time try-on experience of wearing virtual 3D eyeglasses by a wearer, comprising:
   obtaining a plurality of 2D images for a plurality of, pairs of eyeglasses, the pairs of eyeglasses are organized into a group of 2D images, each pair of eyeglasses has a set of 2D images;
   when one designed pair of eyeglasses from the group of 2D images is selected by the wearer, constructing a pair of virtual 3D eyeglasses using the set of 2D images for the designed pair of eyeglasses;
   constructing a 3D face or head model of the wearer based upon one or more facial or head images of the wearer;
   fitting the pair of virtual 3D eyeglasses onto the 3D face or head model of the wearer, with the pair of virtual 3D eyeglasses being simulated as being worn by the wearer; and
   rotating the virtual 3D eyeglasses together with the 3D face or head model according to a change in real-time posture of the face of the wearer;
   wherein each set of the 2D images for each pair of eyeglasses comprises a frontal frame image and at least one side frame image.

2. The method as claimed in claim 1, wherein the step of fitting the pair of virtual 3D eyeglasses onto the 3D face or head model of the wearer comprises:
   moving the virtual 3D eyeglasses together with the 3D face or head model according to the real-time posture of the face of the wearer and one reference point of the face.

3. The method as claimed in claim 1, wherein the step of fitting the pair of virtual 3D eyeglasses onto the 3D face or head model of the wearer comprises:
   zooming in and out the virtual 3D eyeglasses together with the 3D face or head model according to a change in real-time scaling size of the face of the wearer.

4. The method as claimed in claim 1, wherein while the pair of virtual 3D eyeglasses is being simulated as being fittingly worn by the wearer, a right-side glasses frame portion inside the face is trimmed off upon a rotation angle of the 3D face or head model of the wearer is at least 5 degrees to the right.

5. The method as claimed in claim 1, wherein while the pair of virtual 3D eyeglasses is being simulated as being fittingly worn by the wearer, a left-side glasses frame portion inside the face is trimmed off upon a rotation angle of the 3D face or head model of the wearer is at least 5 degrees to the left.

6. The method as claimed in claim 1, wherein each set of the 2D images for each pair of eyeglasses further comprises a pair of 2D lens images; and the pair of 2D lens images of the set of 2D images are based on 2D image that are set at a designated alpha channel value to change the transparency of the lenses of the pair of 3D virtual eyeglasses.

7. The method as claimed in claim 1, wherein each set of the 2D images for each pair of eyeglasses further comprises a pair of 2D lens images; and an environmental mapping effect is applied to the pair of lens images to configure and show a transient modified lens image in place of the 2D lens image in real-time upon satisfying a set criteria according to the real-time posture of the face of the wearer.

8. The method as claimed in claim 1, wherein a shadow effect is applied to the face image of the wearer in real-time using the 3D face or head model.

9. An augmented reality system for real-time try-on of 3D virtual eyeglasses by a wearer, comprising:
   a server, the server having a first memory, a plurality of 2D images for a plurality of pairs of eyeglasses are organized into a group of 2D images, the group of 2D images are stored in the first memory; and
   a host, the host comprising a 3D virtual eyeglasses try-on simulation program, a processor, a camera, a display device and a second memory,
   wherein each pair of eyeglasses has a set of 2D images in the group of 2D images, the set of 2D images is stored in the second memory; the processor is configured to run the 3D virtual eyeglasses try-on simulation program for constructing a pair of virtual 3D eyeglasses using the set of 2D images for one designed pair of eyeglasses retrieved from the second memory when the designed pair of eyeglasses from the group of 2D images is selected by the wearer, constructing a 3D face or head model of the wearer based upon one or more facial and head images of the wearer captured by the camera in real-time, configuring the pair of virtual 3D eyeglasses onto the 3D face or head model of the wearer, with the pair of virtual 3D eyeglasses being simulated as being fittingly worn by the wearer; the display device is configured to display the wearer trying-on the virtual 3D eyeglasses in real-time; and each set of the 2D images for each pair of eyeglasses stored in the first memory and in the second memory, respectively, comprising a frontal frame image and at least one side frame image;
   wherein the processor is configured to run the 3D virtual eyeglasses try-on simulation program for rotating the virtual 3D eyeglasses together with the 3D face or head model according to a change in real-time posture of the face of the wearer.

10. The augmented reality system as claimed in claim 9, wherein the processor is configured to run the 3D virtual eyeglasses try-on simulation program for moving the virtual 3D eyeglasses together with the 3D face or head model according to the real-time posture of the face of the wearer and one reference point of the face.

11. The augmented reality system as claimed in claim 9, wherein the processor is configured to run the 3D virtual eyeglasses try-on simulation program for zooming in and out the virtual 3D eyeglasses together with the 3D face or head model according to a change in real-time scaling size of the face of the wearer.

12. The augmented reality system as claimed in claim 9, wherein while the pair of virtual 3D eyeglasses is being simulated as being fittingly worn by the wearer, a right-side glasses frame portion inside the face is trimmed off upon a rotation angle of the 3D face or head model of the wearer is at least 5 degrees to the right.

13. The augmented reality system as claimed in claim 9, wherein while the pair of virtual 3D eyeglasses is being simulated as being fittingly worn by the wearer, a left-side glasses frame portion inside the face is trimmed off upon a rotation angle of the 3D face or head model of the wearer is at least 5 degrees to the left.

14. The augmented reality system as claimed in claim 9, wherein each set of the 2D images for each pair of eyeglasses further comprises a pair of 2D lens images; and the pair of 2D lens images of the set of 2D images are based on 2D image that are set at a designated alpha channel value to change the transparency of the lenses of the pair of 3D virtual eyeglasses.

15. The augmented reality system as claimed in claim 9, wherein each set of the 2D images for each pair of eyeglasses further comprises a pair of 2D lens images; and an environmental mapping effect is applied to the pair of lens images to configure and show a transient modified lens image in place of the 2D lens image in real-time upon satisfying a set criteria according to the real-time posture of the face of the wearer.

16. The augmented reality system as claimed in claim 9, wherein a shadow effect is applied to the face image of the wearer in real-time using the 3D face or head model.

17. The augmented reality system as claimed in claim 9, wherein the 3D virtual eyeglasses try-on simulation program is an app, and the host is a mobile phone or an electronic wireless device.

18. The augmented reality system as claimed in claim 9, wherein the 3D virtual eyeglasses try-on simulation program is a webpage, the webpage comprising a virtual mirror for trying-on 3D virtual eyeglasses by the wearer, the virtual mirror is configured under a webcam mode or a virtual model mode, upon operating under the webcam mode, real-time facial tracking is performed and a 3D face or head model of the wearer based upon one or more facial or head images of the wearer is generated based upon the real-time facial tracking results.

19. A method to create real-time try-on experience of wearing virtual 3D eyeglasses by a wearer, comprising:
  obtaining a plurality of 2D images for a plurality of pairs of eyeglasses, the pairs of eyeglasses are organized into a group of 2D images, each pair of eyeglasses has a set of 2D images;
  when one designed pair of eyeglasses from the group of 2D images is selected by the wearer, constructing a pair of virtual 3D eyeglasses using the set of 2D images for the designed pair of eyeglasses;
  constructing a 3D face or head model of the wearer based upon one or more facial or head images of the wearer;
  fitting the pair of virtual 3D eyeglasses onto the 3D face or head model of the wearer, with the pair of virtual 3D eyeglasses being simulated as being worn by the wearer; and
  moving the virtual 3D eyeglasses together with the 3D face or head model according to the real-time posture of the face of the wearer and one reference point of the face;
  wherein each set of the 2D images for each pair of eyeglasses comprises a frontal frame image and at least one side frame image.

20. The method as claimed in claim 19, wherein the step of fitting the pair of virtual 3D eyeglasses onto the 3D face or head model of the wearer comprises:
  zooming in and out the virtual 3D eyeglasses together with the 3D face or head model according to a change in real-time scaling size of the face of the wearer.

* * * * *